(12) United States Patent
Liu (10) Patent No.: US 8,632,052 B2
(45) Date of Patent: Jan. 21, 2014

(54) QUICK RELEASE CONNECTOR

(76) Inventor: Hsiu-Hsiung Liu, New Taipei (TW)

(*) Notice: Subject to any disclaimer, the term of this patent is extended or adjusted under 35 U.S.C. 154(b) by 190 days.

(21) Appl. No.: 13/354,419

(22) Filed: Jan. 20, 2012

(65) Prior Publication Data

US 2013/0186491 A1    Jul. 25, 2013

(51) Int. Cl.
*F16L 37/28*    (2006.01)

(52) U.S. Cl.
USPC ..................... 251/149.9; 251/149.6

(58) Field of Classification Search
USPC ............ 251/149.9, 149.6, 149.3, 149.1
See application file for complete search history.

(56) References Cited

U.S. PATENT DOCUMENTS

| | | | | |
|---|---|---|---|---|
| 4,498,658 A | * | 2/1985 | Mikiya | 251/149.6 |
| 4,546,956 A | * | 10/1985 | Moberg | 251/149.6 |
| 4,765,657 A | * | 8/1988 | Cruse | 285/91 |
| 5,423,515 A | * | 6/1995 | Ozaki | 251/149.6 |
| 5,445,358 A | * | 8/1995 | Anderson | 251/149.6 |
| 5,540,250 A | * | 7/1996 | Mullins | 137/77 |
| 5,806,832 A | * | 9/1998 | Larbuisson | 251/149.6 |
| 8,356,794 B1 | * | 1/2013 | Liu | 251/149.9 |
| 2010/0051129 A1 | * | 3/2010 | Kitagawa | 137/798 |
| 2010/0183361 A1 | * | 7/2010 | Davis | 403/24 |
| 2012/0007357 A1 | * | 1/2012 | Liu | 285/318 |

* cited by examiner

*Primary Examiner* — John K Fristoe, Jr.
*Assistant Examiner* — David Colon Morales
(74) *Attorney, Agent, or Firm* — Maier & Maier, PLLC (57) ABSTRACT

A quick release connector has a body, a positioning mount, a sealing valve and an outer sleeve. The body has a threaded end, a connecting end, an air inlet chamber, a mounting recess, a threaded recess, a first sealing ring, a pressing ring, a second sealing ring and a limiting ring. The positioning mount is detachably connected to the body and has a fixing end, an inserting end, an air outlet chamber, a returning spring, multiple ball holes and multiple balls. The sealing valve is movably mounted in the body and the positioning mount, selectively abuts the pressing ring and the second sealing ring and has a closed end, an open end and at least one air inlet. The outer sleeve is slidably mounted around the body and the positioning mount and has a spring recess, a holding recess and a pressing spring.

14 Claims, 9 Drawing Sheets

QUICK RELEASE CONNECTOR

BACKGROUND OF THE INVENTION

1. Field of the Invention

The present invention relates to a connector, and more particularly to a quick release connector that can be assembled conveniently, can be used safely and can provide a preferred sealing effect.

2. Description of Related Art

Figure 9:
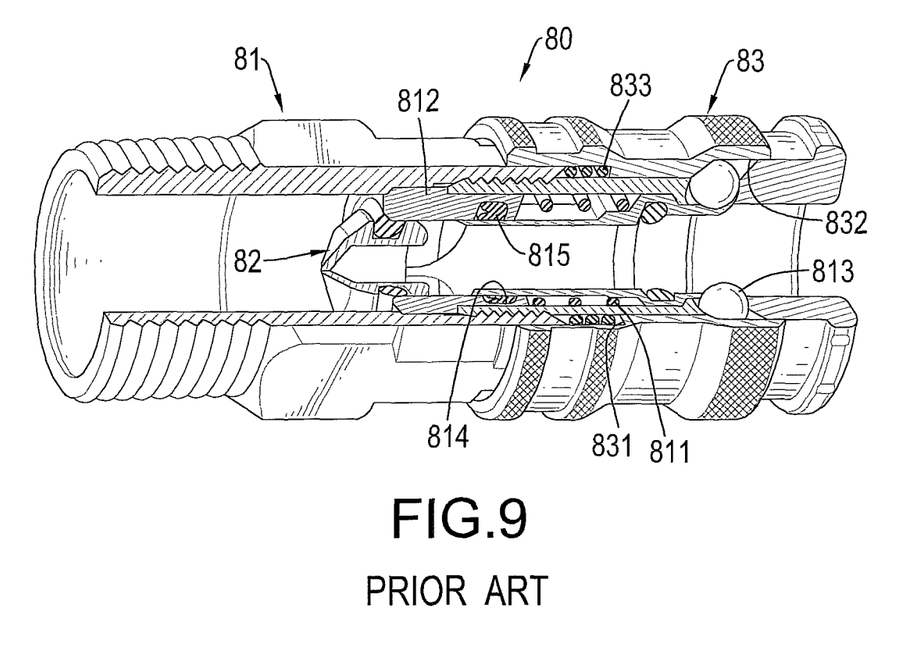
FIG. 9 is a perspective view in partial section of a quick release connector in accordance with the prior art.

With reference to FIG. 9, a conventional quick release connector 80 is used in pipe connections and comprises a body 81, a sealing valve 82 and an outer sleeve 83. The body 81 is made by multiple tubes and has an external surface, a rear end, a returning spring 811, a mounting ring 812 and multiple balls 813. The mounting ring 812 is mounted in the body 81, abuts the returning spring 811 and has an inner surface, a ring recess 814 and a sealing ring 815. The ring recess 814 is formed in the inner surface of the mounting ring 812. The sealing ring 815 is mounted in the ring recess 814 and extends out of the inner surface of the mounting ring 812. The balls 813 are mounted around the external surface of the body 81 at intervals at the rear end of the body 81.

The sealing valve 82 is movably mounted in the body 81 and has a closed end, an open end and an external surface. The returning spring 811 is mounted around the external surface of the sealing valve 82 near the open end of the sealing valve 82. The external surface of the sealing valve 82 abuts the balls 813 of the body 81 near the open end of the sealing valve 82. The outer sleeve 83 is slidably mounted around the body 81 and has two ends, a spring recess 831, a holding recess 832 and a pressing spring 833. The spring recess 831 is formed in the outer sleeve 83 at one of the ends of the outer sleeve 83 and is mounted around the body 81. The holding recess 832 is formed in the outer sleeve 83 and holds the balls 813 inside. The pressing spring 833 is mounted around the body 81 and in the spring recess 831 and abuts the external surface of the body 81 to make the balls 813 held between the holding recess 832 and the external surface of the sealing valve 82.

In assembly, the ring recess 814 is formed in the inner surface of the mounting ring 812 and the sealing ring 815 is not easy to mount in the ring recess 814. In addition, when the sealing valve 82 is mounted in the body 81, the closed end of the sealing valve 82 may compress or rub against the sealing ring 815 and this will cause the sealing ring 815 to deform or be damaged. Then, the sealing effect between the body 81 and the sealing valve 82 will be reduced. Furthermore, the sealing valve 82 of conventional quick release connector 80 can only be used with a specific kind of plug and this will limit the practicability of the conventional quick release connector 80. Additionally, when a plug is connected to a tool and is separated from the quick release connector 80, some of the pressurized air that remains in the tool cannot flow out of the body 81 and the plug and this can make the plug shoot out of the body 81 by the impulsive force of the pressurized air and may injure people and this is unsafe in use.

The quick release connector in accordance with the present invention mitigates or obviates the aforementioned problems.

SUMMARY OF THE INVENTION

The main objective of the invention is to provide a quick release connector that can be assembled conveniently, can be used safely and can provide a preferred sealing effect.

The quick release connector in accordance with the present invention has a body, a positioning mount, a sealing valve and an outer sleeve. The body has a threaded end, a connecting end, an air inlet chamber, a mounting recess, a threaded recess, a first sealing ring, a pressing ring, a second sealing ring and a limiting ring. The positioning mount is detachably connected to the body and has a fixing end, an inserting end, an air outlet chamber, a returning spring, multiple ball holes and multiple balls. The sealing valve is movably mounted in the body and the positioning mount, selectively abuts the pressing ring and the second sealing ring and has a closed end, an open end and at least one air inlet. The outer sleeve is slidably mounted around the body and the positioning mount and has a spring recess, a holding recess and a pressing spring.

Other objects, advantages and novel features of the invention will become more apparent from the following detailed description when taken in conjunction with the accompanying drawings.

DETAILED DESCRIPTION OF PREFERRED EMBODIMENT

Figure 1:
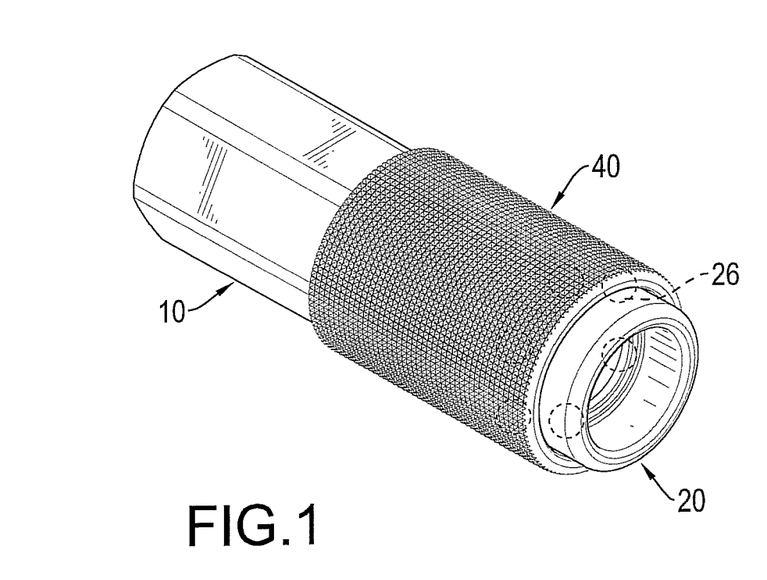
FIG. 1 is a perspective view of a quick release connector in accordance with the present invention.
Figure 2:
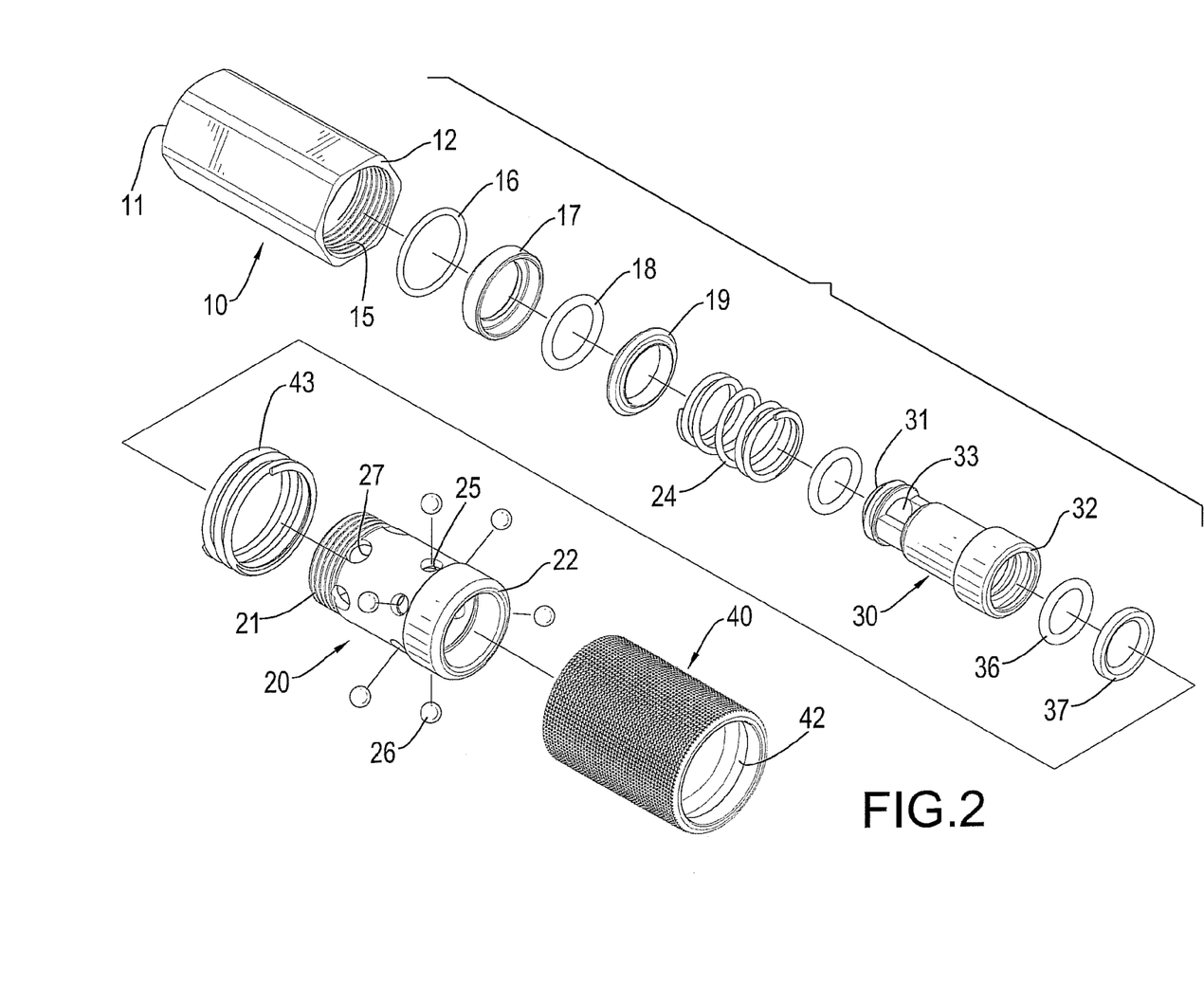
FIG. 2 is an exploded perspective view of the quick release connector in FIG. 1.
Figure 3:
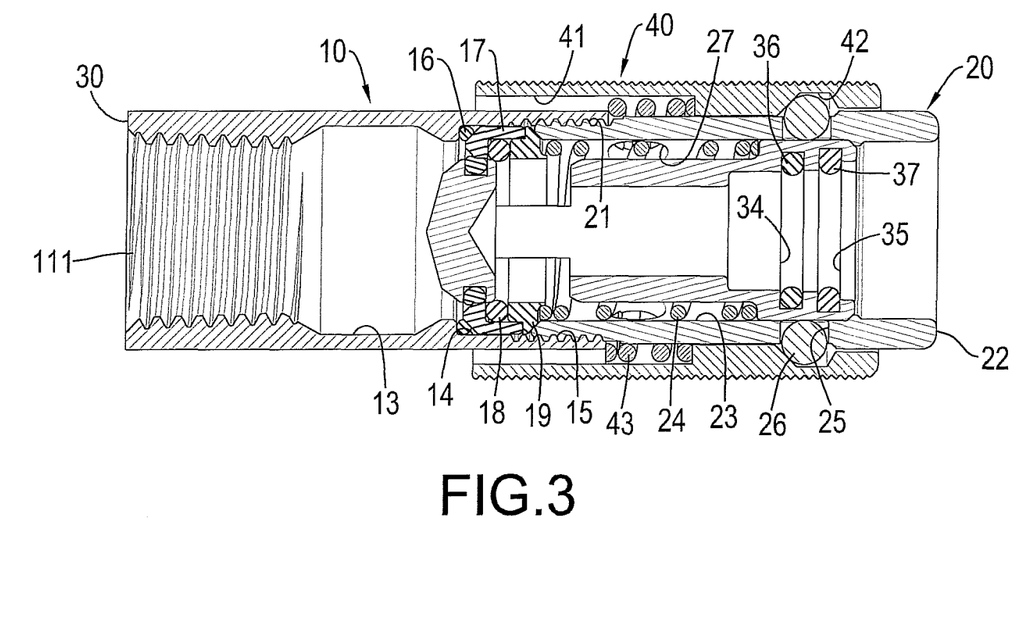
FIG. 3 is a cross sectional side view of the quick release connector in FIG. 1.

With reference to FIGS. 1 to 3, a quick release connector (M-type) in accordance with the present invention comprises a body 10, a positioning mount 20, a sealing valve 30 and an outer sleeve 40.

Figure 8A:
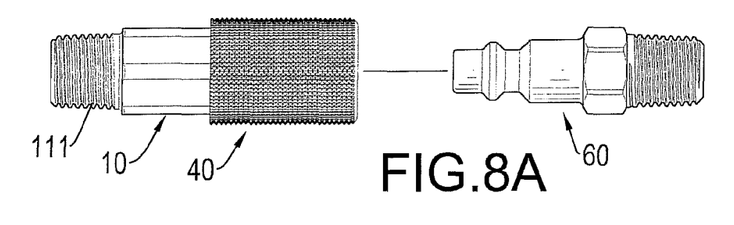
FIG. 8A is an operational side view of a second embodiment of a quick release connector in accordance with the present invention showing the plug being inserted into the connector.

The body 10 is hollow and has an external surface, an internal surface, a threaded end 11, a connecting end 12, an air inlet chamber 13, a mounting recess 14, a threaded recess 15, a first sealing ring 16, a pressing ring 17, a second sealing ring 18 and a limiting ring 19. The threaded end 11 of the body 10 is connected to an air compressor and has a thread 111. With reference to FIGS. 3 and 8A, the thread 111 is formed in the internal surface of the body 10 at the threaded end 11 or is formed on the external surface of the body 10 at the threaded end 11. The connecting end 12 of the body 10 is formed with the threaded end 11 of the body 10. The air inlet chamber 13 is formed in the body 10 near the threaded end 11, communicates with the air compressor directly or with a pipe or the like and has a diameter. Preferably, the air inlet chamber 13 has a divergent end and a convergent end. The divergent end is formed in the air inlet chamber 13 near the threaded end 11 of the body 10 and the convergent end is formed in the air inlet chamber 13 near the mounting recess 14 of the body 10 to improve the smoothness of air flow.

The mounting recess 14 is formed in the body 10, communicates with the air inlet chamber 13 and has an internal surface, a protruding face and a diameter smaller than the diameter of the air inlet chamber 13. The protruding face is formed on the internal surface of body 10 at the mounting recess 14 near the air inlet chamber 13. The threaded recess 15 is formed in the body 10 near the connecting end 12 and communicates with the mounting recess 14 and the air inlet chamber 13. The first sealing ring 16 is mounted in the mounting recess 14 of the body 10 and abuts against the protruding face of the mounting recess 14. The pressing ring 17 is mounted in the mounting recess 14 and abuts the first sealing ring 16. The second sealing ring 18 is mounted in the pressing ring 17 and is opposite to the first sealing ring 16. The limiting ring 19 is mounted in the threaded recess 15 and abuts the second sealing ring 18 and the pressing ring 17.

Figure 5:
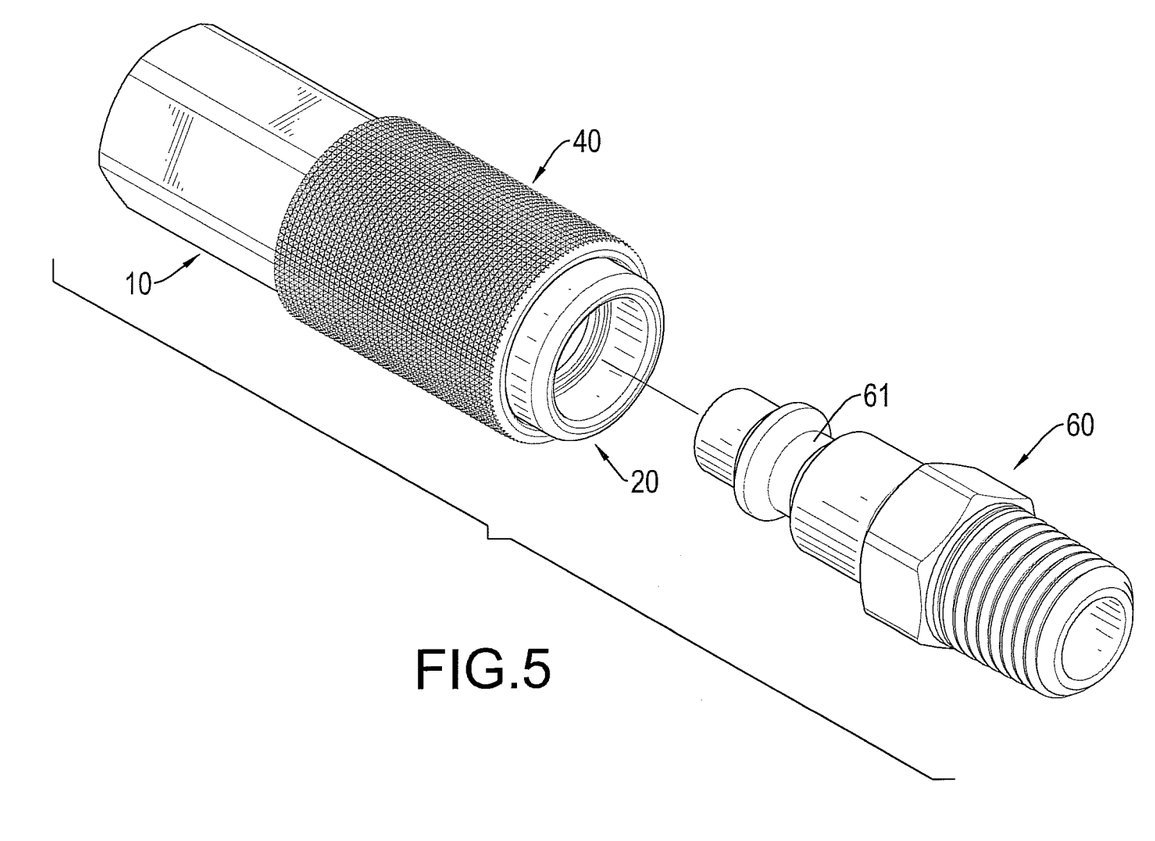
FIG. 5 is an operational exploded perspective view of the quick release connector in FIG. 1 showing a plug being inserted into the connector.
Figure 6:
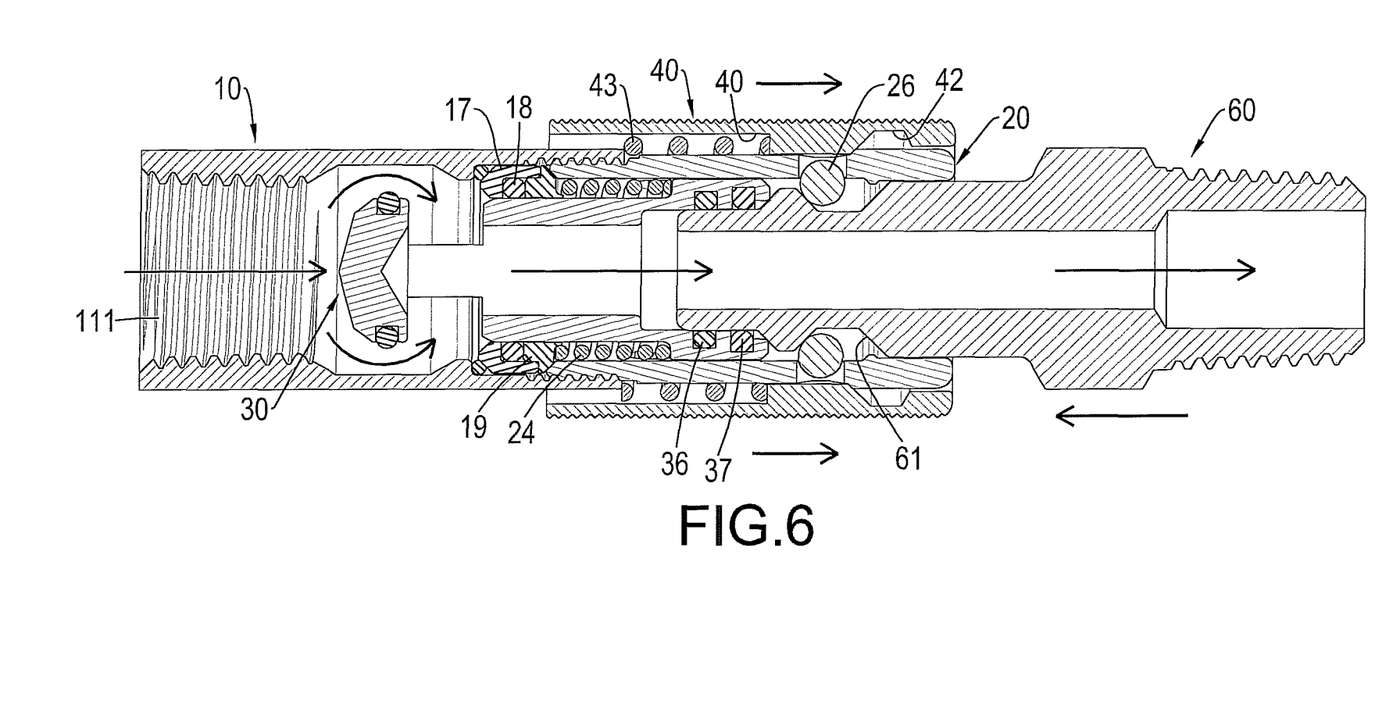
FIG. 6 is an operational cross sectional side view of the quick release connector in FIG. 5 showing the plug being inserted into the connector.

The positioning mount 20 is detachably connected to the body 10 and has an external surface, an internal surface, a fixing end 21, an inserting end 22, an air outlet chamber 23, a returning spring 24, multiple ball holes 25, multiple balls 26 and multiple releasing holes 27. The fixing end 21 of the positioning mount 20 is inserted into the connecting end 12 of the body 10, is securely mounted in the threaded recess 15 of the body 10 to connect the positioning mount 20 with the body 10 and abuts against the limiting ring 19 to hold the sealing rings 16, 18 and the pressing ring 17 securely mounted in the mounting recess 14 of the body 10. With further reference to FIGS. 2 and 5, the inserting end 22 of the positioning mount 20 is formed with the fixing end 21 and is connected to a plug 60. The air outlet chamber 23 is formed in the positioning mount 20 and communicates with the mounting recess 14 and the air inlet chamber 13 of the body 10.

Figure 4:
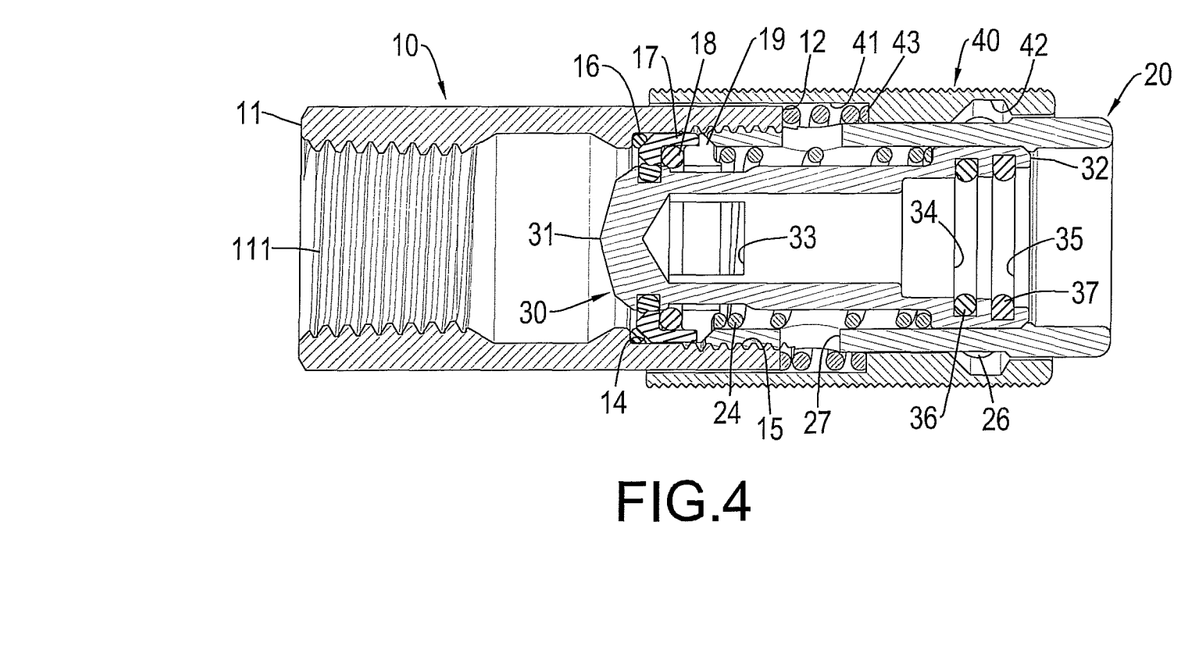
FIG. 4 is another cross sectional side view of the quick release connector in FIG. 1.

The returning spring 24 is mounted in the air outlet chamber 23 of the positioning mount 20, abuts the limiting ring 19 and has two ends. One of the ends of the returning spring 24 abuts the limiting ring 17. The ball holes 25 are formed through the external surface of the positioning mount 20 at intervals near the inserting end 22 of the positioning mount 20. The ball holes 25 are arranged in a circle around the positioning mount 20 and communicate with the air outlet chamber 23. The balls 26 are respectively held in the ball holes 25 in the positioning mount 20. With reference to FIGS. 2 and 4, the releasing holes 27 are formed through the external surface of the positioning mount 20 at intervals between the fixing end 21 and the ball holes 25 and communicate with the air outlet chamber 23.

With reference to FIGS. 2 and 3, the sealing valve 30 is movably mounted in the body 10 and the positioning mount 20, selectively abuts the pressing ring 17 and the second sealing ring 18 of the body 10 and has an external surface, an internal surface, a closed end 31, an open end 32, at least one air inlet 33, a ring recess 34, an annular recess 35, a third sealing ring 36 and a mounting ring 37. The closed end 31 of the sealing valve 30 is enlarged and is mounted in the air inlet chamber 13 of the body 10 and mounted through the sealing rings 16, 18, the pressing ring 17 and the limiting ring 19 to selectively close a passage between the air inlet chamber 13 and the mounting recess 14 of the body 10. The open end 32 of the sealing valve 30 is mounted in the air outlet chamber 23 of the positioning mount 20 and communicates with the air outlet chamber 23. The external surface of the sealing valve 30 abuts the balls 26 at the open end 32. The returning spring 24 is mounted around the sealing valve 30 and the other end of the returning spring 24 abuts the external surface of the sealing valve 30 near the open end 32.

The at least one air inlet 33 is formed radially through the external surface of the sealing valve 30 near the closed end 31 and selectively communicates with the air inlet chamber 13 of the body 10 or the air outlet chamber 23 of the positioning mount 20. The ring recess 34 is formed in the internal surface of the sealing valve 30 near the open end 32 of the sealing valve 30. The annular recess 35 is formed in the internal surface of the sealing valve 30 between the open end 32 and the ring recess 34 of the sealing valve 30. The third sealing ring 36 is mounted in the ring recess 34 of the sealing valve 30 to abut an external surface of the plug 60 as shown in FIG. 5. The mounting ring 37 is mounted in the annular recess 35 of the sealing valve 30 to abut the external surface of the plug 60 as shown in FIG. 5. The rings 36, 37 of the sealing valve 30 can provide a preferred sealing effect to the plug 60 when the plug 60 is connected to the quick release connector in accordance with the present invention.

The outer sleeve 40 is slidably mounted around the body 10 and the positioning mount 20 and has a mounting end, a pushing end, an internal surface, a spring recess 41, a holding recess 42 and a pressing spring 43. The mounting end of the outer sleeve 40 is mounted around the body 10 near the connecting end 12. The pushing end of the outer sleeve 40 is mounted around the positioning mount 20 near the inserting end 22. The spring recess 41 is formed in the internal surface of the outer sleeve 40 at the mounting end and is mounted around the body 10 and the positioning mount 20.

The holding recess 42 is formed in the internal surface of the outer sleeve 40 at the pushing end and holds the balls 26 of the positioning mount 20 inside to keep the outer sleeve 40 from escaping from the positioning mount 20. The pressing spring 43 is mounted around the positioning mount 20 in the spring recess 41 and abuts the connecting end 12 of the body 10 to make the balls 26 held between the holding recess 42, the ball holes 25 and the external surface of the sealing valve 30 at the open end 32.

With reference to FIGS. 3 and 4, when the threaded end 11 of the body 10 is connected to an air compressor and the quick release connector as described is not connected with a plug, the closed end 31 of the sealing valve 30 abuts against the pressing ring 17 and the second sealing ring 18 to close the passage between the air inlet chamber 13 and the mounting recess 14 of the body 10 by a force of the returning spring 24 and the pressure of the pressurized air. The pressurized air from the air compressor through the air inlet chamber 13 of the body 10 is blocked by the closed end 31 of the sealing valve 30 and the pressing ring 17 and the second sealing valve 18 of the body 10 and is kept from leaking.

In addition, when assembling the sealing valve 30 between the body 10 and the positioning mount 20, the second sealing ring 18 can be mounted in the mounting recess 14 of the body 10 conveniently between the pressing ring 17 and the limiting ring 19. Furthermore, the pressing ring 17 and the limiting ring 19 can prevent the second sealing ring 18 from wearing or being compressed by the closed end 31 of the sealing valve 30 when assembling the quick release connector in accordance with the present invention. Additionally, the fixing end 21 of the positioning mount 20, the returning spring 24 and the limiting ring 19 can push the pressing ring 17 and the second sealing ring 18 to abut the closed end 31 of the sealing valve 30 closely and this can improve the sealing effect of the quick release connector.

With reference to FIGS. 5 and 3, a plug 60 with an annular engaging recess 61 connected to a tool is inserted into the sealing valve 30 by one hand via the inserting end 22 of the positioning mount 20 to abut against the third sealing ring 36 and the mounting ring 37 and to push the open end 32 of the sealing valve 30 to enable the sealing valve 30 to move to the threaded end 11 of the body 10. When the annular engaging recess 61 of the plug 60 moves inward to align with the ball holes 25 of the positioning mount 20, the balls 26 will escape from the holding recess 42 of the outer sleeve 40 and move into the annular engaging recess 61 of the plug 60. When the balls 26 move to the annular engaging recess 61 of the plug 60, the pressing spring 43 will push the outer sleeve 40 to move toward the inserting end 22 of the positioning mount 20 to enable the balls 26 to engage the annular engaging recess 61 of the plug 60 firmly between the ball holes 25 and the internal surface of the outer sleeve 40. Then, the closed end 31 of the sealing valve 30 departs away from the pressing ring 17 and the second sealing ring 18 to allow the at least one air inlet 33 of the sealing valve 30 to communicate with the air inlet chamber 13 of the body 10 and this can enable the pressurized air to flow into the plug 60 via the at least one air inlet 33. Thus, the pressurized air will flow into the tool that is connected with the plug 60 via the body 10, the sealing valve 30 and the plug 60.

Figure 7:
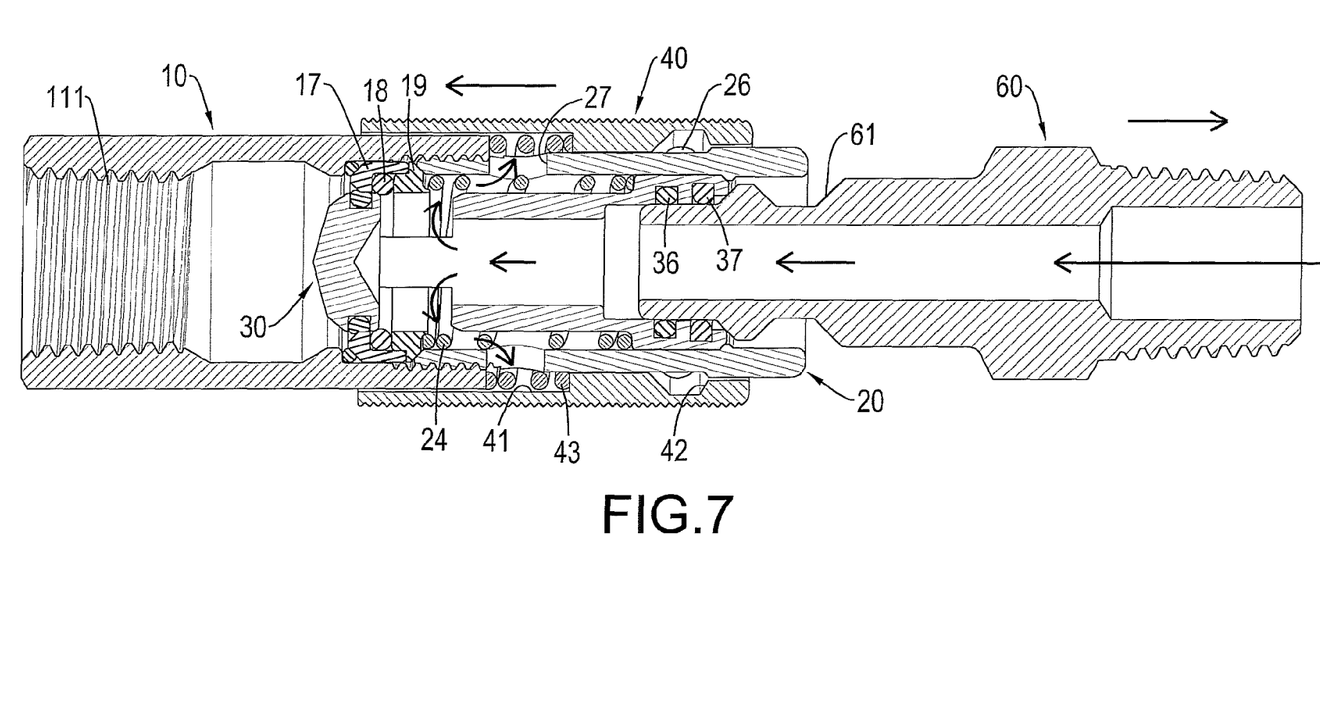
FIG. 7 is an operational cross sectional side view of the quick release connector in FIG. 5 showing the plug being separated from the connector.

With reference to FIG. 7, to separate the plug 60 from the positioning mount 20 of the quick release connector in accordance with the present invention, the outer sleeve 40 is pushed to move forward to the threaded end 11 of the body 10 so that the balls 26 are pushed by an external surface of the plug 60 beside the annular engaging recess 61 to escape from the annular engaging recess 61 of the plug 60 and move into the holding recess 42. Thus, the plug 60 can be separated from the inserting end 22 of the positioning mount 20 easily. When the plug 60 is separated from the positioning mount 20, the sealing valve 30 moves back to the original position by the force of the returning spring 24 to make the closed end 31 of the sealing valve 30 abut the pressing ring 17 and the second sealing ring 18 to close the passage between the air inlet chamber 13 and the mounting recess 14 of the body 10.

Figure 8B:
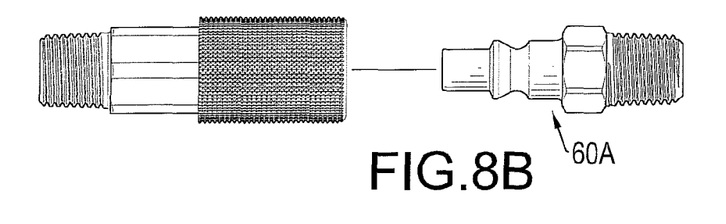
FIGS. 8B and 8C are operational side views of a quick release connector in accordance with the present invention showing different types of plugs being inserted into the connectors.
Figure 8C:
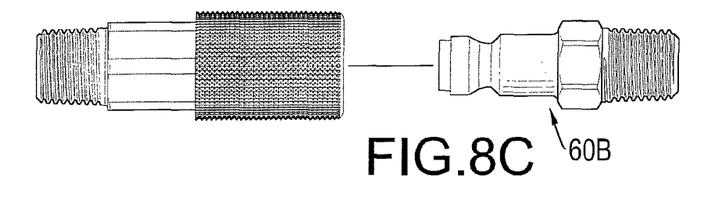

When the plug 60 is separated from the positioning mount 20 and the sealing valve 30 moves back to the original position, some of the pressurized air that remains in the tool can be flowed out of the positioning mount 20 and the plug 60 via the releasing holes 27. Thus, the plug 60 will not be pushed to shoot out of the positioning mount 20 by the impulsive force of the pressurized air and this can prevent the plug 60 from injuring people. In addition, with reference to FIGS. 8B and 8C, different kinds of plugs 60A (A-type) and 60B (T-type) also can be held firmly with the positioning mount 20 by the balls 26.

The body 10 and the positioning mount 20 are manufactured to connect with each other to hold the sealing rings 16, 18, the pressing ring 17 and the limiting ring 19 securely in the mounting recess 14 by the pressing forces of the fixing end 21 of the positioning mount 20 and the returning spring 24. Then, the sealing valve 30, the pressing ring 17 and the second sealing ring 18 can provide a preferred sealing effect to the quick release connector. In addition, the pressing ring 17 and the limiting ring 19 can prevent the second sealing ring 18 from wearing or being compressed by the closed end 31 of the sealing valve 30 when assembling the quick release connector in accordance with the present invention.

In addition, the third sealing ring 36 and the mounting ring 37 of the sealing valve 30 can enable the quick release connector in accordance with the present invention to be used with different kinds of plugs 60, 60A, 60B. Furthermore, some of the pressurized air that remains in the tool can be flowed out of the positioning mount 20 and the plug 60 via the releasing holes 27 and this can prevent the plug 60 from shooting out of the positioning mount 20 by the impulsive force of the pressurized air to injure people. Additionally, the divergent end is formed in the air inlet chamber 13 near the threaded end 11 of the body 10 and the convergent end is formed in the air inlet chamber 13 near the mounting recess 14 of the body 10 to improve the smoothness of the pressurized air flow.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A quick release connector comprising:
a body being hollow and having an external surface;
an internal surface;
a threaded end being adapted to connect to an air compressor;
a connecting end formed with the threaded end of the body;
an air inlet chamber formed in the body near the threaded end and having a diameter;
a mounting recess formed in the body, communicating with the air inlet chamber and having an internal surface;
a protruding face formed on the internal surface of the body at the mounting recess near the air inlet chamber;
and a diameter being smaller than the diameter of the air inlet chamber;
a threaded recess formed in the body near the connecting end and communicating with the mounting recess and the air inlet chamber;
a first sealing ring mounted in the mounting recess of the body and abutting against the protruding face of the mounting recess;
a pressing ring mounted in the mounting recess and abutting the first sealing ring;
a second sealing ring mounted in the pressing ring and being opposite to the first sealing ring;
and
a limiting ring mounted in the threaded recess and abutting the second sealing ring and the pressing ring;
a positioning mount detachably connected to the body and having an external surface;
an internal surface;
a fixing end inserted into the connecting end of the body, securely mounted in the threaded recess of the body to connect the positioning mount with the body and abutting against the limiting ring to hold the sealing rings and the pressing ring securely mounted in the mounting recess of the body;
an inserting end formed with the fixing end to connect a plug;
an air outlet chamber formed in the positioning mount and communicating with the mounting recess and the air inlet chamber of the body;
a returning spring mounted in the air outlet chamber of the positioning mount, abutting the limiting ring and having two ends, and one of the ends of the returning spring abutting the limiting ring;
multiple ball holes formed through the external surface of the positioning mount at intervals near the inserting end of the positioning mount, arranged in a circle around the positioning mount and communicating with the air outlet chamber;
and multiple balls respectively held in the ball holes in the positioning mount;
a sealing valve movably mounted in the body and the positioning mount, selectively abutting the pressing ring and the second sealing ring of the body and having an external surface abutting the balls at the open end and the other end of the returning spring abutting the external surface of the sealing valve near the open end;
an internal surface;
a closed end being enlarged and mounted in the air inlet chamber of the body and mounted through the sealing rings, the pressing ring and the limiting ring to selectively close a passage between the air inlet chamber and the mounting recess of the body;
an open end mounted in the air outlet chamber of the positioning mount and communicating with the air outlet chamber;
and
at least one air inlet formed radially through the external surface of the sealing valve near the closed end and selectively communicating with the air inlet chamber of the body or the air outlet chamber of the positioning mount;
and an outer sleeve slidably mounted around the body and the positioning mount and having a mounting end mounted around the body near the connecting end;
a pushing end mounted around the positioning mount near the inserting end;
an internal surface;
a spring recess formed in the internal surface of the outer sleeve at the mounting end and mounted around the body and the positioning mount;
a holding recess formed in the internal surface of the outer sleeve at the pushing end and holding the balls of the positioning mount inside to keep the outer sleeve from escaping from the positioning mount;
and
a pressing spring mounted around the positioning mount in the spring recess and abutting the connecting end of the body to make the balls held between the holding recess, the ball holes and the external surface of the sealing valve at the open end.

2. The quick release connector as claimed in claim 1, wherein the positioning mount has multiple releasing holes formed through the external surface of the positioning mount at intervals between the fixing end and the ball holes and communicating with the air outlet chamber.

3. The quick release connector as claimed in claim 2, wherein the air inlet chamber has a divergent end formed in the air inlet chamber near the threaded end of the body; and
a convergent end formed in the air inlet chamber near the mounting recess of the body.

4. The quick release connector as claimed in claim 3, wherein the body has a thread formed in the internal surface of the body at the threaded end.

5. The quick release connector as claimed in claim 3, wherein the body has a thread formed on the external surface of the body at the threaded end.

6. The quick release connector as claimed in claim 1, wherein the sealing valve has a ring recess formed in the internal surface of the sealing valve near the open end of the sealing valve;
an annular recess formed in the internal surface of the sealing valve between the open end and the ring recess of the sealing valve;
a third sealing ring mounted in the ring recess of the sealing valve; and
a mounting ring mounted in the annular recess of the sealing valve.

7. The quick release connector as claimed in claim 2, wherein the sealing valve has a ring recess formed in the internal surface of the sealing valve near the open end of the sealing valve;
an annular recess formed in the internal surface of the sealing valve between the open end and the ring recess of the sealing valve;
a third sealing ring mounted in the ring recess of the sealing valve; and
a mounting ring mounted in the annular recess of the sealing valve.

8. The quick release connector as claimed in claim 3, wherein the sealing valve has a ring recess formed in the internal surface of the sealing valve near the open end of the sealing valve;
an annular recess formed in the internal surface of the sealing valve between the open end and the ring recess of the sealing valve;
a third sealing ring mounted in the ring recess of the sealing valve; and
a mounting ring mounted in the annular recess of the sealing valve.

9. The quick release connector as claimed in claim 4, wherein the sealing valve has a ring recess formed in the internal surface of the sealing valve near the open end of the sealing valve;
an annular recess formed in the internal surface of the sealing valve between the open end and the ring recess of the sealing valve;
a third sealing ring mounted in the ring recess of the sealing valve; and
a mounting ring mounted in the annular recess of the sealing valve.

10. The quick release connector as claimed in claim 5, wherein the sealing valve has a ring recess formed in the internal surface of the sealing valve near the open end of the sealing valve;
an annular recess formed in the internal surface of the sealing valve between the open end and the ring recess of the sealing valve;
a third sealing ring mounted in the ring recess of the sealing valve; and
a mounting ring mounted in the annular recess of the sealing valve.

11. The quick release connector as claimed in claim 1, wherein the body has a thread formed in the internal surface of the body at the threaded end.

12. The quick release connector as claimed in claim 1, wherein the body has a thread formed on the external surface of the body at the threaded end.

13. The quick release connector as claimed in claim 2, wherein the body has a thread formed in the internal surface of the body at the threaded end.

14. The quick release connector as claimed in claim 2, wherein the body has a thread formed on the external surface of the body at the threaded end.

* * * * *